United States Patent [19]
Kalfsbeek et al.

[11] 3,911,530
[45] Oct. 14, 1975

[54] SYSTEM AND METHOD FOR REMOVING FEATHERS FROM DUCKS AND OTHER FOWL

[76] Inventors: James S. Kalfsbeek, 8th and Elm Sts., College City, Calif. 95931; Peter C. Kalfsbeek, Rte. 1, Box 123, Williams, Calif. 95490

[22] Filed: Feb. 5, 1973

[21] Appl. No.: 329,520

[52] U.S. Cl. .............................. 17/11.1 R; 69/26
[51] Int. Cl.² ........................................ A22C 21/02
[58] Field of Search............. 17/11.1 R, 47; 15/311, 15/383; 69/26

[56] References Cited
UNITED STATES PATENTS

| | | | |
|---|---|---|---|
| 1,006,304 | 10/1911 | Smith | 17/11.1 R |
| 1,218,174 | 3/1917 | Faint | 17/11.1 R |
| 1,230,222 | 6/1917 | Reiske | 17/11.1 R |
| 1,233,904 | 7/1917 | Patton | 17/11.1 R |
| 1,474,702 | 11/1923 | Atkinson | 17/47 X |
| 1,737,225 | 11/1929 | Dunner | 17/11.1 R |
| 1,809,891 | 6/1931 | Dunner | 17/11.1 R |
| 2,113,232 | 4/1938 | Hinchliffe | 17/11.1 R |
| 2,206,731 | 7/1940 | Schlicksupp | 17/11.1 R |
| 2,260,855 | 10/1941 | Kittredge | 17/11.1 R |
| 2,753,590 | 7/1956 | McKendree | 17/11.1 R |
| 3,694,848 | 10/1972 | Alcala | 15/383 |

FOREIGN PATENTS OR APPLICATIONS

126,590  6/1959  U.S.S.R. ........................ 17/11.1 R

*Primary Examiner*—Robert Peshock
*Assistant Examiner*—James D. Hamilton
*Attorney, Agent, or Firm*—Townsend and Townsend

[57] ABSTRACT

A system and method for plucking ducks and other fowl is disclosed. A device is illustrated having a feather plucking head adapted to pluck feathers from the fowl. The feather plucking head has a pair of juxtaposed rollers, at least one of which is lobed or eccentric to intermittently engage the other. The rollers are located at one end of a suction channel which draws the feathers between the rollers. When the rollers engage, the feathers are grapsed near their base and snapped off the bird much as if they were hand plucked. The rollers have grooved surfaces corresponding with the longitudinal members of a protective grating, and the rollers are located such that the roller surfaces between the grooves extend into the slots in the grating between the longitudinal members. A down stripping head is also connected to the suction channel, and a collection box is located in the channel so that the feathers and down are compacted in the box.

7 Claims, 5 Drawing Figures

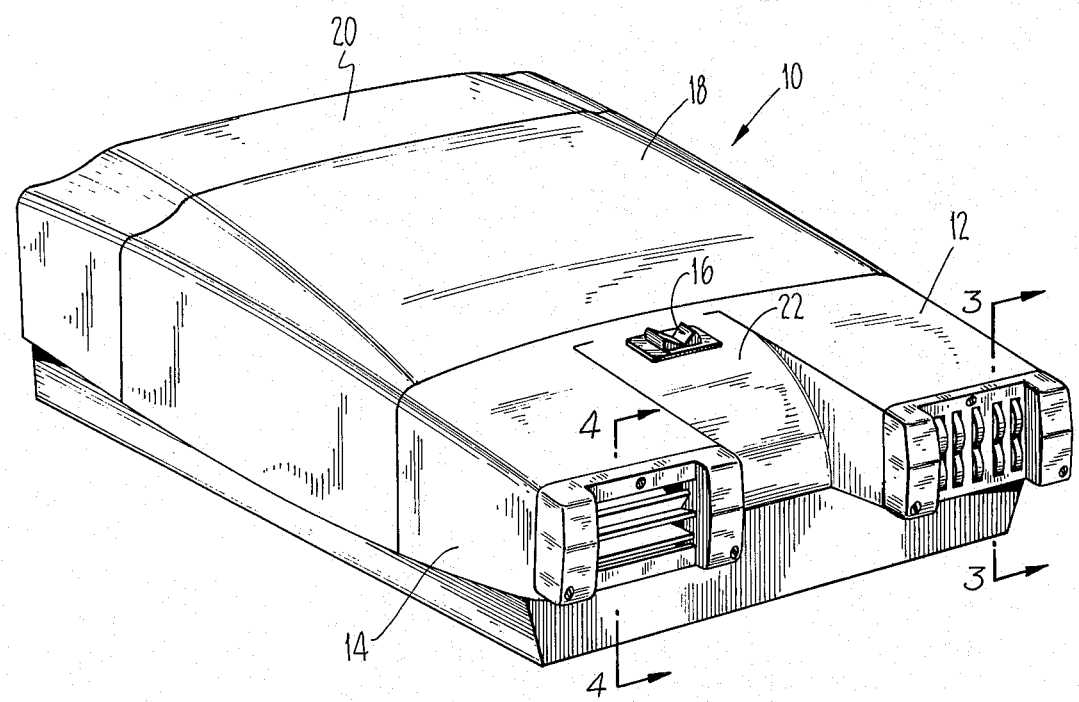
Fig_1
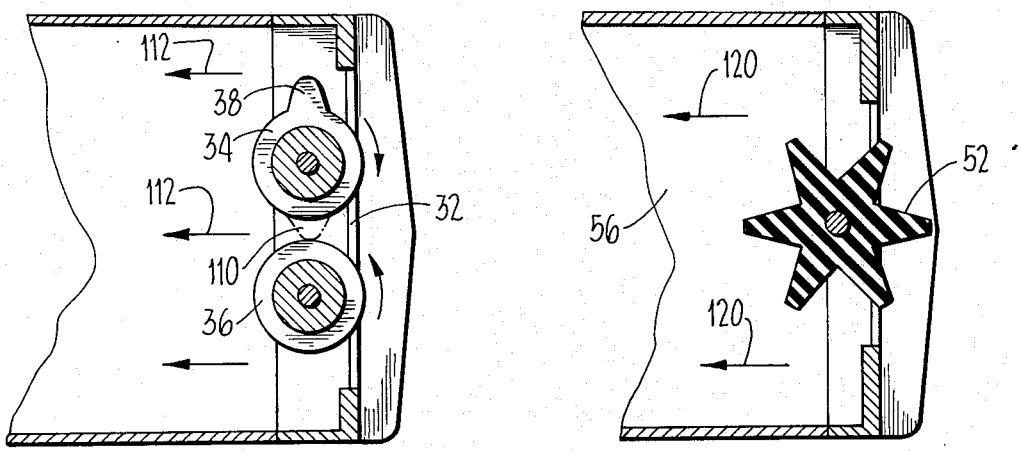
Fig_3
Fig_4

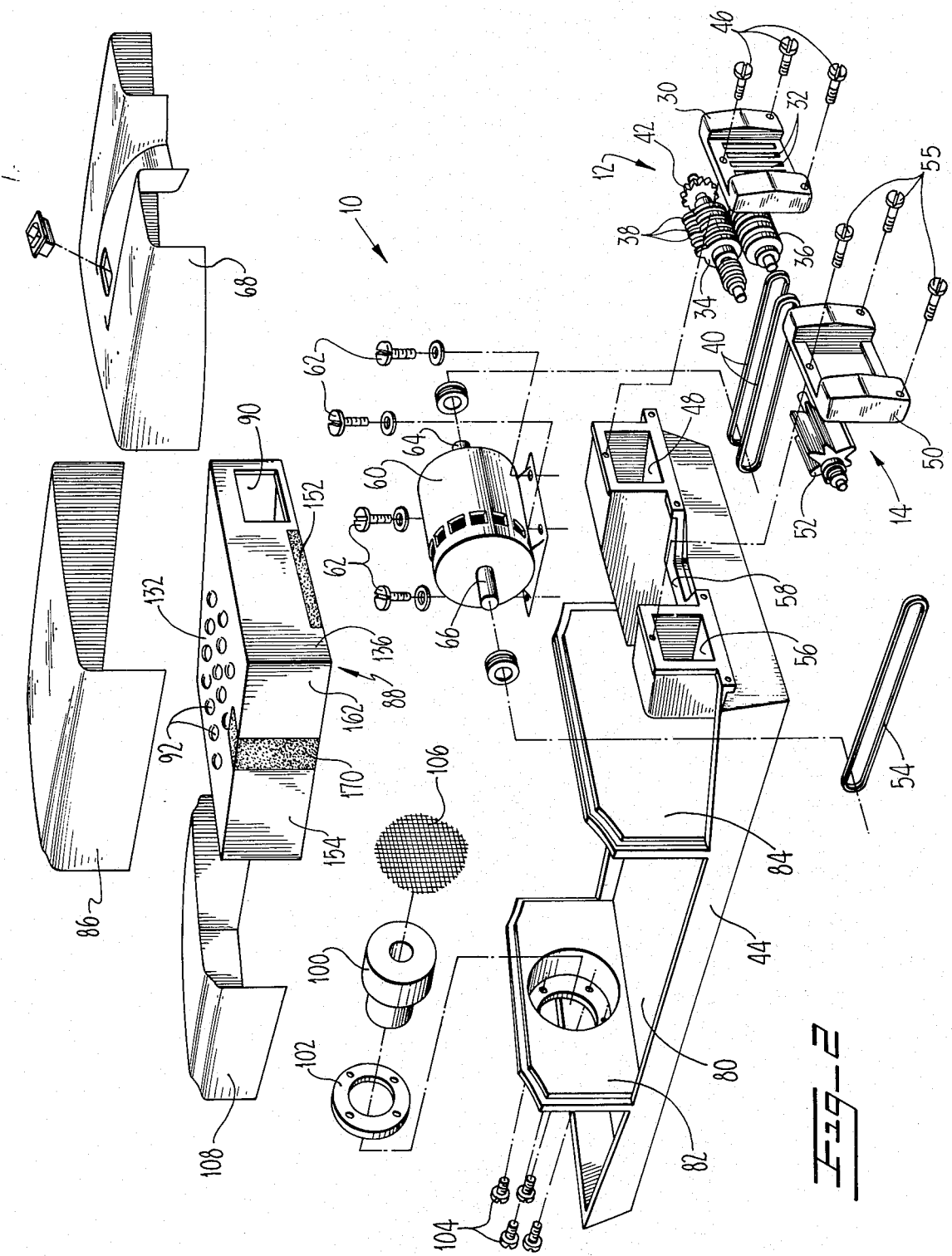

SYSTEM AND METHOD FOR REMOVING FEATHERS FROM DUCKS AND OTHER FOWL

BACKGROUND OF THE INVENTION

1. Field of the Invention

The invention relates to a system and method for removing feathers from ducks and other fowl, and particularly relates to a device for dry-plucking game birds wherein the action of hand plucking is closely simulated.

2. Description of the Prior Art

Two basic types of feather plucking apparatus exist in the prior art. The first is the drum method, wherein a large rotating drum is provided with a surface lined with flexible rubber fingers which effectively "scrub" the feathers off the fowl. The drum method is well adapted to commercial usage, but does not lend itself to use by sportsmen with game birds. A game bird normally has shot and fall wounds which would be aggravated by the scrubbing action, and the drum is too large for convenient personal use.

A second method better adapted for use with game birds employs rollers to pluck the bird. However, devices of this type currently available use generally circular rollers in substantially continuous engagement, opening only briefly, if at all, to allow passage of air therethrough. This has the effect of applying a continuous force to the feathers, drawing them off the bird with a wringer action, and tends to pull the skin of the bird between the rollers. Devices utilizing the roller method have been heretofore substantially unsuccessful since virtually all game birds have loose or tender skin which would get caught in the rollers.

SUMMARY OF THE INVENTION

The present invention discloses apparatus using the roller method which avoids the wringer action that caused problems in prior devices. In the present invention, feathers are drawn between the rollers through suction, not by the rollers themselves, which only intermittently engage for brief intervals. A continuous grating is provided which prevents drawing the skin of the bird between the rollers. The rollers are grooved so that the roller surfaces between the grooves can extend through the grating. When the rollers engage, the feather is grasped near its base. The feather is then effectively "snapped" off the bird as in hand-plucking rather than pulled with a constant tension, and there is virtually no damage to the bird in the vicinity of shot and fall wounds.

The present invention provides a complete system for cleaning game birds. In addition to the plucking apparatus, a down stripping mechanism is also provided which uses a rubber paddle to remove the pin feathers and down which are not removed by the feather plucker. A vacuum suction system is used to draw the feathers and down into a disposal box. The disposal box is mounted intermediate the plucking and stripping apparatus and the suction source, and has porous sides so that air inside the box is drawn out of all sides of the box. In this manner, the box is fully and completely filled with feathers, rather than being loosely filled as would be the case if it were downstream of the suction device.

While feathers are of limited value, down is an extremely valuable commodity for use in winter garments and sleepwear. The apparatus contains separate feather plucking and down stripping devices, and a separate box may be used to gather the down so that it does not become intermixed with the feathers. In commercial applications, the feather stripping device and the down stripping device can be connected to separate collection boxes to facilitate the collection of the down.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a preferred embodiment of the present invention.

FIG. 2 is an exploded view of the preferred embodiment illustrated in FIG. 1.

FIG. 3 is a side cross-sectional view of the feather plucking head taken along line 3—3 of FIG. 1.

FIG. 4 is a side cross-sectional view of the down stripping head taken along line 4—4 of FIG. 1.

DESCRIPTION OF THE PREFERRED EMBODIMENT

Figure 5:
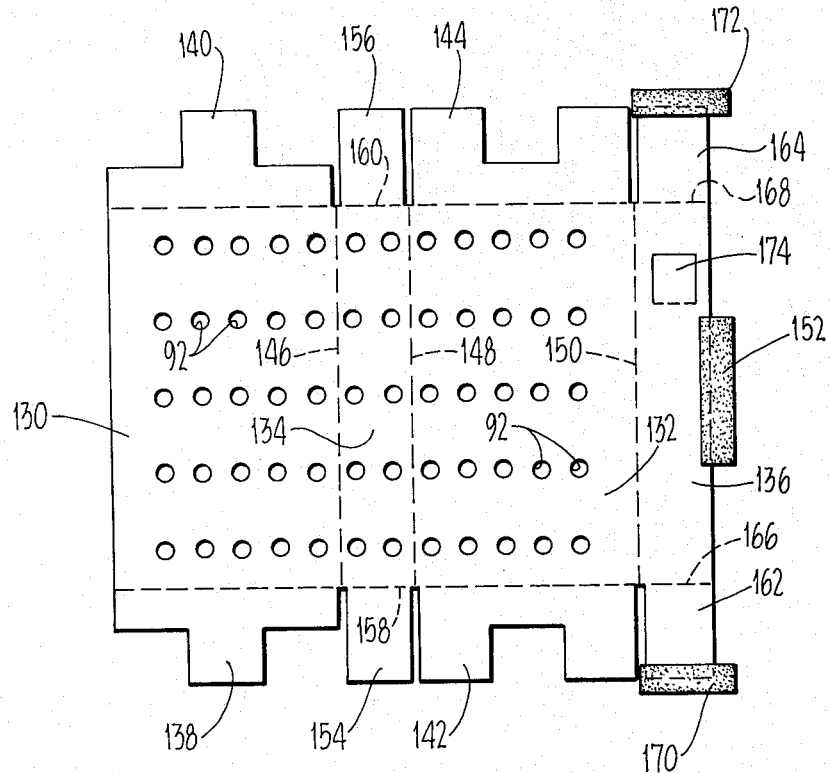
FIG. 5 is a layout view of a cardboard sheet used to form the collection box.

The preferred embodiment 10 of the present invention is illustrated in perspective in FIG. 1. A feather plucking head 12 and a down stripping head 14 are located in tandem at one end of the apparatus 10. A switch 16 controlling the motor which drives the feather plucking head 12 and the down stripping head 14 is located in close proximity to the heads to allow quick deactivation. A removable cover 18 encloses the center of the apparatus 10, and provides access to a collection box located therein. A suction motor therefor is located in the aft section 20 of the apparatus 10. A separate motor, located in the forward compartment 22, drives the feather plucking head 12 and the down stripping head 14. The device 10 illustrated is preferably constructed with a solid metal frame and a plastic exterior. Plastic sold under the trademark CYCOLAC can be used to provide a tough exterior, and the frame is preferably cast aluminum to minimize weight.

Referring next to FIG. 2, the internal components of the apparatus 10 are illustrated by way of an exploded view. The feather plucking head 12 is comprised of a solid metal cap 30 supporting a plurality of longitudinal members 32 to form a grate having longitudinal slots therein. A pair of juxtaposed rollers 34 and 36 having grooved surfaces are located near the grating members 32. The grooves in rollers 34 and 36 correspond to the longitudinal members 32 so that the surfaces of the rollers between the grooves extend into the longitudinal slots between the members. The rollers are ordinarily not mutually engaged, but one roller 34 has lobes 38 on the surfaces thereof between the grooves so that the lobes engage the other roller 36 once each revolution. Either or both rollers could be lobed or eccentric. The top roller 34 is driven by dual belts 40. A circular gear 42 on one end of the top roller 34 engages with a similar hidden gear on bottom roller 36 so that the juxtaposed rollers are mutually counterdriven. The metal cap 30 is attached to the frame 44 by means of bolts 46, and surrounds a channel 48 integrally formed in the frame 44 to place the feather plucking head in communication with the channel 48. In commercial embodiments of the device, channel 48 could comprise a flexible hose to provide mobility to the feather plucking head 12.

The down stripping head 14 comprises a metal plate 50 and a star shaped paddel 52. The paddle 52 is preferably constructed of rubber or other flexible material, and is driven by belt 54. The plate 50 attaches to the frame 44 with bolts 55 and encloses a second inner channel 56. The second inner channel 56 is in communication with the first inner channel 48 by means of a channel 58 running along the front section of the frame 44. Channel 58 could also be at least partially flexible to provide mobility to the stripping head 14, and could connect with a second disposal box (not shown).

A motor 60 is located in the front section of the frame 44 by bolts 62. The motor 60 has output shafts on either sides, one shaft 64 adapted to drive the feather plucking head 12 by means of dual belts 40, and another shaft 66 adapted to drive the down stripping head 14 by means of belt 54. A plastic cover 68, preferably of "CYCOLAC", encloses the front section of the apparatus 10. A switch 16 controlling motor 60 projects through the plastic cover 68.

A central chamber 80 is formed in the center of the apparatus 10. The chamber 80 is enclosed by the center section of the frame 44 including bulkheads 82 and 84 and a three sided removable plastic covering 86. The plastic covering 86 is fitted to the bulkheads 82 and 84 and the sides of the frame 44 so as to form a substantially air-tight chamber. A collection box 88 can be placed in the chamber 80 to receive feathers and down from the feather plucking head 12 and down stripping head 14. The collection box 88 has an entrance aperture 90 mating with interior channel 48, which is in turn connected to channel 56 by channel 58. The collection box 88 is preferably of cardboard or like material, and has a series of cutouts 92 on the (hidden) lower and back sides thereof as well as on the upper surface 132 as illustrated. The cardboard collection box is lined with porous material which covers the cutouts 92. The collection box 88 also could be singularly constructed of porous material.

The aft section of the apparatus 10 includes a suction motor 100 mounted to the aft bulkhead 82 by a ring 102 and bolts 104. A protective screen 106 is interposed between the suction device 100 and the air-tight chamber 80. The aft section of the apparatus 10 is enclosed by plastic covering 108. The suction device 100 draws air from the chamber 80 which comes from inside the disposal box 88 outwardly through the porous sidewalls thereof. Air enters the box 88 from channel 48 which is directly connected to the feather plucking head 12 and to the down stripping head 14 by channels 48, 58 and 56. Hence, air flows continuously in through heads 12 and 14 into the box 88 and out through the sidewalls of the box.

The particular construction of the feather plucking head 12 is further illustrated by reference to FIG. 3. FIG. 3 is a section view which cuts the head along one of the grooves in the top roller 34 and bottom roller 36. As illustrated, the surface of the top roller 34 normally does not engage the surface of bottom roller 36. However, a lobe 38 on roller 34 is adapted to engage roller 36 as illustrated by phantom 110. Alternately, a round roller 34 could have been eccentrically mounted (not shown) to intermittently engage roller 36. The surface of rollers 34 and 36 between the grooves projects into the slot between adjacent longitudinal members 32. Air is drawn between the longitudinal members as illustrated by arrows 112 so that the feathers are sucked between the rollers. The rollers 34 and 36 are preferably disengaged more than they are engaged, since a large volume of air must be allowed to freely flow therebetween in order to properly draw the feathers between the rollers by suction.

The construction of the down stripping head 14 is further illustrated by way of reference to FIG. 4, a cross sectional view thereof. The multibladed paddle 52 is mounted in the opening of walled channel 56 so that a continuous flow of air enters the channel as illustrated by arrows 120. In this manner, down stripped off the fowl by the multibladed paddle 52 is ingested through channel 56 into the disposal box 88 as illustrated in FIG. 2.

A preferred embodiment of the collection box 88 is demonstrated by way of reference to FIG. 5, in which the layout of the cardboard sheet used to form the box is illustrated. Parts of the sheet are correspondingly numbered with the assembled box of FIG. 2. The cardboard sheet has a first primary rectangular face 130 and a second primary rectangular face 132, joined together by a first intermediate rectangular face 134. A second intermediate rectangular face 136 is attached to the second primary face 132 on the side opposite the first intermediate face 134. The first primary face 130 has male tabs 138 and 140 located on opposite sides of that face. Corresponding female slots 142 and 144 are located on opposite sides of the second primary face 132.

In forming the cardboard sheet into the shape of a box, the first primary face 130 and first intermediate face 134 are folded along crease 146 so that a 90° angle is formed therebetween. Also, the second primary face 142 is folded relative to the first intermediate face 134 along crease 148 to form a 90° angle therebetween. In this manner, the first primary face 130 becomes mutually parallel to the second primary face 132, and tab 140 can be meshed with slot 144, and tab 138 with slot 142.

The second intermediate face 136 can be folded along crease 150 so that the edge of this face is in abutment with the outside edge of face 130. The second intermediate face 136 can then be attached to first primary face 130 by means of a tape strip 152 connected to the second intermediate face. To securely enclose the sides of the box, the first intermediate face 134 is provided with flaps 154 and 156 on either side thereof, which can be folded along creases 158 and 160 to cover the tabs and slots. Flaps 162 and 164 located on opposite sides of second intermediate face 136, can then be folded along creases 166 and 168 over folded flaps 154 and 156. The ends of the box are then secured by means of pieces of tape 170 and 172 attached to flaps 162 and 164. The pieces of tape 170 and 172 can be stuck to the flaps 154 and 156 and to the first and second primary faces 130 and 132 to completely seal the ends of the box.

An entrance flap 174 is provided on the second intermediate face 136. The entrance flaps 174 is moveable, and can be pushed out of the way to provide an entrance opening to the interior of the box. A plurality of cutouts 92 are formed in this first and second primary faces 130 and 132, and in the first intermediate face 134. A sheet of porous material (not shown) is attached to the interior surface of the cardboard sheet and covers the cutouts therethrough so that the side walls of the box are partially porous. As an alternative, the box could be formed totally of porous material, but it has been found preferable to use ordinary cardboard with cutouts and a porous covering.

In operation, a duck or other fowl is held up to the grating formed by longitudinal members 32. The fowl need not be soaked or heated, but is preferably dry. The feathers of the fowl are drawn into the space between juxtaposed rollers 34 and 36 by means of the suction exerted by suction device 100. When the eccentric extension 38 of roller 34 engages lower roller 36, the feather is grasped close to the skin line since the rollers extend through the grating. The feather is then rapidly snapped off the bird much as if it were hand plucked. The skin of the fowl cannot come between the rollers because of the grating and loose skin near shot and fall wounds is not pulled into the mechanism due to the rapid snapping action.

After the feather is plucked by the feather plucking head 12 into channel 48, it is drawn through that channel into the collection box 88 by the flow of air from the channel back through the suction device 100. Since air is drawn outwardly through almost all sides of the collection box, the feathers become packed throughout the box. If a concentration of feathers forms in one portion of the box, the porous openings 92 in that region will be somewhat blocked, decreasing the air flow in that area and increasing it in a different area of the box, resulting in accumulation of feathers in the latter area. The end result is that the box is fully compacted with feathers.

After the larger feathers have been plucked from the fowl by the feather plucking head 12, remaining pin feathers and down are removed by the down stripping head 14. The fowl is held against the multibladed paddle 52 which strips the down and pin feathers from the fowl with a gentle rubbing action. The down is stripped into channel 56, drawn through channel 58 to channel 48, and then into the box 88 in the same manner as the feathers.

Although the preferred embodiment has been described in detail, modifications and adaptations may occur to those skilled in the art. For example, while a unitary structure is disclosed, commercial applications might require that the feather plucking head 12 and down stripping head 14 be mounted on independent flexible hoses and that independent disposal boxes be utilized for each head. This and other modifications and adaptations may be made without departing from the spirit and scope of the present invention, as set forth in the claims.

What is claimed is:

1. A feather plucking head comprising:
    a grating having longitudinal slots bounded by relatively closely-spaced continuous longitudinal members;
    a pair of juxtaposed driven rollers having radially grooved surfaces, said grooves corresponding to the longitudinal members of the grating and said rollers located such that the roller surfaces between the grooves extend into the longitudinal slots in the grating;
    suction means adapted to draw the feathers of a fowl placed against the grating between the rollers; and
    means for intermittently engaging the roller surfaces between the grooves of the juxtaposed rollers, said roller surfaces being disengaged more than engaged so that the intermittent engagement thereof grasps feathers drawn between the rollers by the suction means to snap them off the fowl with a plucking action.

2. A feather plucking head as recited in claim 1 wherein the means for intermittently engaging the roller surfaces comprises at least one lobe on the surface of at least one roller.

3. A feather plucking head as recited in claim 1 wherein one of the pair of juxtaposed rollers is eccentrically mounted on a driven shaft such that the roller surfaces intermittently engage.

4. Apparatus for removing feathers from ducks and other fowl, said apparatus comprising:
    a walled channel having a grating at one end; means for applying suction at the other end of the channel to draw the feathers through the grating and into the one end of the channel; a pair of rollers in said one end of the channel, at least one of said rollers having a single lobe normally disengaged from the other roller but adapted to intermittently engage the other roller to grasp feathers drawn through the grating by the suction means to a position between the rollers and snap them from the fowl in a plucking action.

5. Apparatus as recited in claim 4 and additionally comprising a second walled channel, means for applying suction at one end of the channel; and a bladed star-shaped paddle of flexible material at the other end of the channel adapted to strip down from a fowl held up to the paddle, said down drawn through said second channel by said suction means.

6. Apparatus as recited in claim 4 and additionally comprising a porous box interposed in said channel so that feathers drawn through the channel are trapped in said box for retrieval and disposal of said feathers.

7. Apparatus as recited in claim 4 wherein the grating has longitudinal slots bounded by relatively closely spaced longitudinal members, and wherein said rollers have grooved surfaces, said grooves corresponding to the longitudinal members of the grating and said rollers being disposed such that the roller surfaces between the grooves extend into the longitudinal slots in the grating to grasp the feathers of the fowl near their base.

* * * * *